United States Patent
Ootaka

(10) Patent No.: US 9,499,117 B2
(45) Date of Patent: Nov. 22, 2016

(54) CAPACITANCE TYPE OCCUPANT SENSOR HAVING NOISE ELECTRODE

(71) Applicant: DENSO CORPORATION, Kariya, Aichi-pref. (JP)

(72) Inventor: Kouji Ootaka, Toyohashi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 12 days.

(21) Appl. No.: 14/617,005

(22) Filed: Feb. 9, 2015

(65) Prior Publication Data

US 2015/0224952 A1    Aug. 13, 2015

(30) Foreign Application Priority Data

Feb. 10, 2014  (JP) ................................. 2014-023321

(51) Int. Cl.
*B60R 21/015* (2006.01)
*G01R 27/26* (2006.01)
*G01V 3/08* (2006.01)
*G01D 5/24* (2006.01)

(52) U.S. Cl.
CPC ....... *B60R 21/01532* (2014.10); *G01D 5/2405* (2013.01); *G01V 3/08* (2013.01)

(58) Field of Classification Search
CPC .......... B60R 21/01532; G01D 5/2405; G01D 5/24; G01V 3/08; B60N 2002/0268; B60N 2/002
USPC ................................. 324/663, 664, 665, 667
See application file for complete search history.

(56) References Cited

U.S. PATENT DOCUMENTS

| 2006/0164254 A1* | 7/2006 | Kamizono | ........ B60R 21/01532 340/667 |
| 2008/0100425 A1 | 5/2008 | Kiribayashi | |
| 2010/0073181 A1* | 3/2010 | Ootaka | ................... B60R 25/00 340/667 |

FOREIGN PATENT DOCUMENTS

| JP | 07-270541 | 10/1995 |
| JP | 2008-111809 | 5/2008 |

* cited by examiner

*Primary Examiner* — Billy Lactaoen
(74) *Attorney, Agent, or Firm* — Harness, Dickey & Pierce, P.L.C.

(57) ABSTRACT

A capacitance type occupant sensor includes an electrostatic sensing unit, a reference electrode, a voltage applying portion, a current sensing portion, a capacitance calculating portion, and a discriminating portion. The reference electrode is applied with a reference potential. The electrostatic sensing unit is disposed in a vehicle seat, and includes a main electrode, a guard electrode and a noise electrode. The guard electrode is disposed adjacent to a lower side of the main electrode and applied with the reference potential. The noise electrode is disposed adjacent to a lower side of the guard electrode. The voltage applying portion applies a detection voltage to the main electrode and the noise electrode. The current sensing portion senses a main current of the main electrode, and a noise current of the noise electrode. The capacitance calculating portion calculates a first capacitance based on the detection voltage, the main current, and the noise current.

4 Claims, 5 Drawing Sheets

CAPACITANCE TYPE OCCUPANT SENSOR HAVING NOISE ELECTRODE

CROSS REFERENCE TO RELATED APPLICATION

This application is based on Japanese Patent Application No. 2014-23321 filed on Feb. 10, 2014, the disclosure of which is incorporated herein by reference.

TECHNICAL FIELD

The present disclosure relates to a capacitance type occupant sensor for a vehicle.

BACKGROUND

A capacitance type occupant sensor is, for example, disclosed in JP 2008-111809 A, which corresponds to U.S. 2008/0100425 A1. The capacitance type occupant sensor has an electrode installed inside a seat of a vehicle. The capacitance type sensor determines whether the seat is occupied by an occupant and a type of the occupant, such as an adult or a child seated on a child restraint system (CRS) (hereinafter, also referred to as a child safety seat) based on the change in capacitance between the electrode and a reference electrode provided by such as a vehicle body.

Specifically, the capacitance to be sensed varies according to a difference of a specific inductive capacity of an object to be sensed, which is located between the electrodes. The object to be sensed is discriminated based on the change of the capacitance. For example, the specific inductive capacity of air is approximately 1, and the specific inductive capacity of the CRS is approximately 2 to 5. Also, the specific inductive capacity of an adult is approximately 50. The change of the capacitance can be obtained from an impedance calculated based on current and voltage sensed between the electrodes.

SUMMARY

Vehicles are equipped with various types of electronic devices. Electrodes of an electrostatic sensor are disposed in an environment that is likely to be affected by electric noise of the electronic devices. In order to improve sensitivity to an occupant, the shape or the like of the electrodes has been studied. However, when the sensitivity of the electrodes to the occupant becomes high, sensitivity to the electrical noise also becomes high. In order to improve accuracy to sense the occupant, the measure against the electrical noise is necessary. In a case where an electrical noise filter is separately provided or in a structure to sense and remove the noise using a separate device from the electrostatic sensor, the space for installing such a device increases and the number of parts increases.

It is an object of the present disclosure to provide a capacitance type occupant sensor capable of reducing an influence of electrical noise on occupant discrimination, while restricting an increase in installation space and an increase in number of parts.

According to an aspect of the present disclosure, a capacitance type occupant sensor includes an electrostatic sensing unit, a reference electrode, a voltage applying portion, a current sensing portion, a capacitance calculating portion and a discriminating portion. The reference electrode is applied with a reference potential. The electrostatic sensing unit is disposed in a seat of a vehicle. The electrostatic sensing unit includes a main electrode, a guard electrode and a noise electrode. The guard electrode is disposed adjacent to a lower side of the main electrode, and is applied with the reference potential. The noise electrode is disposed adjacent to a lower side of the guard electrode. The voltage applying portion applies a detection voltage to the main electrode and the noise electrode. The current sensing portion senses a main current flowing in the main electrode and a noise current flowing in the noise electrode. The capacitance calculating portion calculates a first capacitance based on the detection voltage, the main current and the noise current. The discriminating portion discriminates an occupant based on the first capacitance.

In the above structure, the noise electrode is disposed below the main electrode and the guard electrode within the electrostatic sensing unit. Therefore, when the main current is affected by an electric noise, the noise current is also affected by the electric noise. Because the noise current to which the electric noise is applied is used to calculate a capacitance, at least a part of the electric noise applied to the main current can be removed. Namely, the capacitance calculating portion calculates the first capacitance using the noise current. Therefore, discriminating portion can discriminate the occupant with the capacitance in which an influence of the electric noise is reduced. Accordingly, the influence of the electric noise on the discrimination of the occupant can be reduced.

In addition, the noise electrode is disposed in the electrostatic sensor unit together with the main electrode. Therefore, other parts and installation space for the parts are not necessary. As such, it is less likely that the installation space and the number of parts will increase.

For example, a current value (current waveform) in which at least a part of an electric noise component is cancelled can be sensed by calculating a difference between the main current and the noise current. The electric noise component can be removed by changing a magnitude of the noise current or the main current with a predetermined ratio, and calculating the difference between the noise current and the main current after being changed.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, embodiments of the present disclosure will be described with reference to the drawings. Hereinafter, like parts are designated with like reference numbers throughout the embodiments, and descriptions thereof will not be repeated. The drawings used for the explanation are schematic diagrams, and the shape of each part illustrated may not necessarily be strict.

First Embodiment

Figure 1:
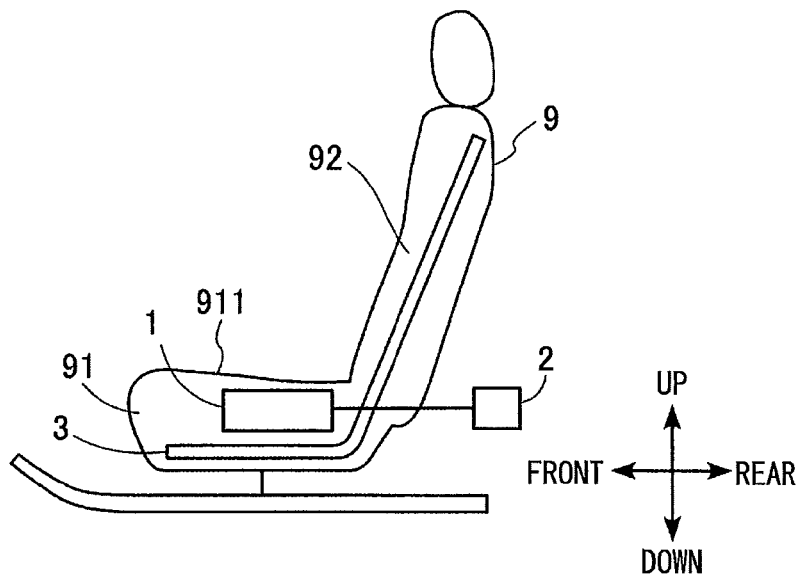
FIG. 1 is a diagram schematically illustrating a capacitance type occupant sensor arranged in association with a vehicle seat according to a first embodiment of the present disclosure.

Referring to FIG. 1, a capacitance type occupant sensor according to a first embodiment includes an electrostatic sensing unit 1, an occupant sensor ECU 2, and a reference electrode 3. The electrostatic sensing unit 1 includes a sensor mat having a film shape in which electrodes are disposed.

The electrostatic sensing unit 1 is disposed inside of a seat bottom 91 of a vehicle seat 9, such as inside of a seat cushion of the seat bottom 91. The seat 9 includes the seat bottom 91 and a seat back 92. The seat bottom 91 has a seat surface 911 on which an occupant is seated. The seat back 92 is disposed on a rear side of the seat bottom 91 with respect to a vehicle front and rear direction. The electrostatic sensing unit 1 is disposed substantially parallel to the seat surface 911.

Figure 2:
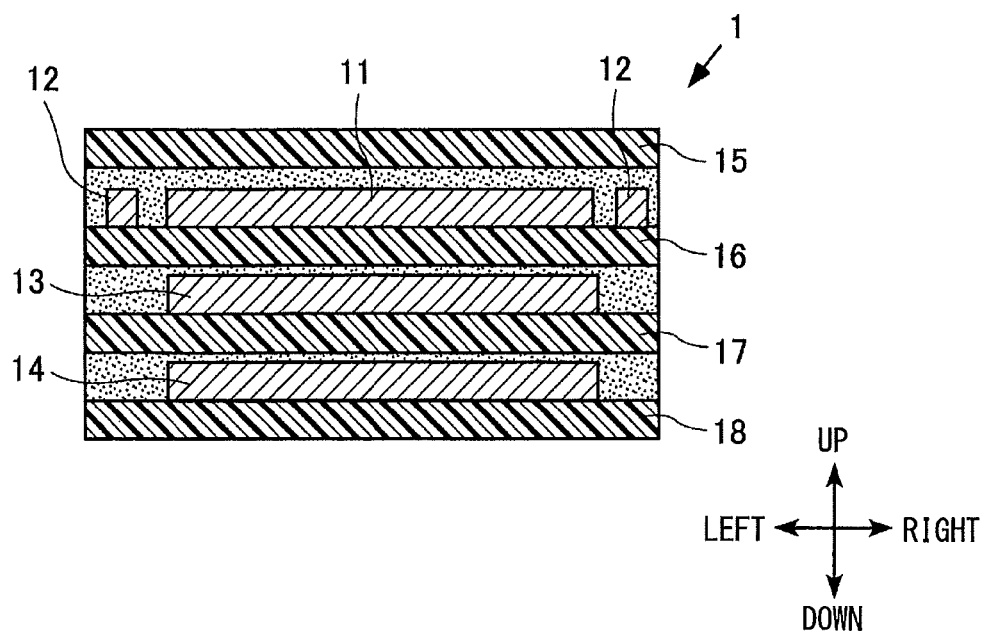
FIG. 2 is a diagram illustrating a schematic cross-section of an electrostatic sensing unit of the capacitance type occupant sensor according to the first embodiment.
Figure 3:
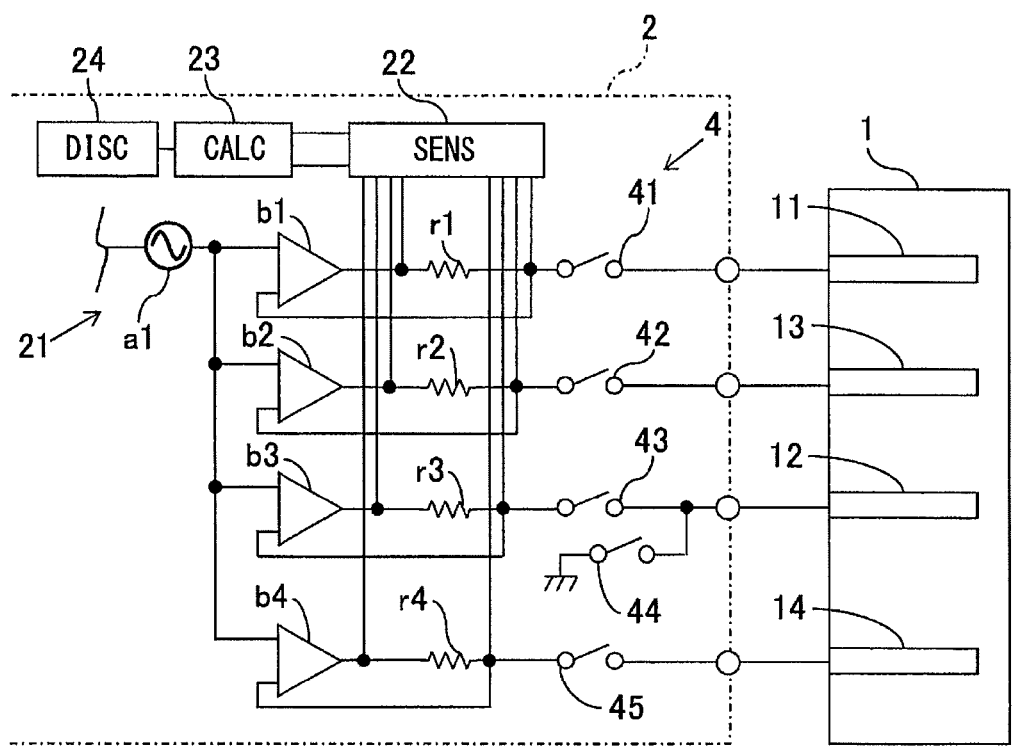
FIG. 3 is a block diagram illustrating a structure of the capacitance type occupant sensor according to the first embodiment.

As shown in FIGS. 2 and 3, the electrostatic sensing unit 1 includes a main electrode 11, a sub electrode 12, a guard electrode 13, a noise electrode 14, and film members 15 to 18. The main electrode 11 is a conductive member having a plate shape. The main electrode 11 is disposed on the film member 16.

The sub electrode 12 is a conductive member having a long and narrow plate shape. The sub electrode 12 is spaced from the main electrode 11 and is parallel with the main electrode 11. The sub electrode 12 is disposed along the main electrode 11 on the film member 16 to be side by side with the main electrode 11. The sub electrode 12 is disposed on opposite sides of the main electrode 11. The film member 15 is disposed on the main electrode 11 and the sub electrode 12. In other words, the main electrode 11 and the sub electrode 12 are disposed between the film member 15 and the film member 16.

The guard electrode 13 is a conductive member having a plate shape. The guard electrode 13 is disposed to oppose the main electrode 11, at a lower side of the main electrode 11, that is, on a side opposite to the seat surface 911 with respect to the main electrode 11. In particular, the guard electrode 13 is opposed to the main electrode 11 through the film member 16. In other words, the guard electrode 13 is disposed at an area corresponding to the main electrode 11 with respect to a stacking direction of the film members 15 to 18, such as in an up and down direction in FIG. 2. The guard electrode 13 has the same shape as the main electrode 11. The guard electrode 13 is disposed on the film member 17. In other words, the guard electrode 13 is disposed between the film member 16 and the film member 17.

The noise electrode 14 is a conductive member having a plate shape. The noise electrode 14 is disposed to oppose the guard electrode 13 at a lower side of the guard electrode 13, that is, on a side opposite to the seat surface 911 with respect to the guard electrode 13. In particular, the noise electrode 14 is opposed to the guard electrode 13 through the film member 17. In other words, the noise electrode 14 is disposed at an area corresponding to the guard electrode 13 with respect to a stacking direction of the film members 15 to 18, such as in an up and down direction in FIG. 2. The noise electrode 14 has the same shape as the main electrode 11. In other words, the noise electrode 14 has an area (surface area) equal to the area (surface area) of the main electrode 11.

In this description, the phrase "equal" means exactly equal and substantially equal.

The noise electrode 14 is disposed on the film member 18. In other words, the noise electrode 14 is disposed between the film member 17 and the film member 18. The film members 15 to 18 are made of an insulating material, such as polyethylene terephthalate (PET). For example, an adhesive is disposed between the respective film members 15 to 18.

The occupant sensor ECU 2 is an electronic control unit including a CPU, a memory and the like. As shown in FIG. 3, the occupant sensor ECU 2 includes, as structures and functions, a voltage applying portion 21, a current sensing portion 22 (SENS), a capacitance calculating portion 23 (CALC), a discriminating portion 24 (DISC) and a switching unit 4.

The voltage applying portion 21 is connected to a vehicle ground (reference potential) GND, and can be connected to each of the electrodes 11 to 14 of the electrostatic sensing unit 1. The voltage applying portion 21 includes an alternating current source a1, and a plurality of operational amplifiers b1 to b4. The voltage applying portion 21 can apply an AC voltage (detection voltage) to each of the electrodes 11 to 14 through the switching unit 4. The operational amplifiers b1 to b4 are drivers for applying a voltage having the same potential as that of the detection voltage.

In an occupant sensing mode, which will be described later, each of the electrodes 11 to 14 generates an electric field with the reference electrode 3. For example, the reference electrode 3 is provided by at least one of a seat frame and a vehicle body. The vehicle body provides a body of the vehicle as well as the electrode. The vehicle body is applied with the reference potential (vehicle ground GND). The seat frame is also provided with the reference potential.

The current sensing portion 22 is a current sensor, and senses an electric current flowing in each of the electrodes 11 to 14 when each of the electrodes 11 to 14 is applied with the voltage by the voltage applying portion 21. The current sensing portion 22 senses a current flowing in each of resistors r1 to r4.

The capacitance calculating portion 23 calculates a predetermined capacitance (i.e., first capacitance) between the electrodes based on the voltage (detection voltage) applied to each of the electrodes 11 to 14 by the voltage applying portion 21 and the current sensed by the current sensing portion 22.

The capacitance can be calculated based on an imaginary component (or susceptance) of an impedance (or admittance) on a current path generated when the voltage is applied. The imaginary component can be sensed using a phase shift of the current and the voltage. In the present embodiment, the capacitance calculating portion 23 calculates a susceptance and a conductance on the current path generated when the voltage is applied. Calculation of the capacitance on the current path corresponds to calculation of the impedance of the current path. It can be said that the capacitance calculating portion 23 calculates the impedance based on the voltage and the current.

The discriminating portion 24 determines whether the seat 9 is occupied by an occupant, and discriminates the occupant, for example, determines whether the occupant on the seat 9 is an adult or a CRS, based on a detection result of the capacitance calculating portion 23 and a predetermined threshold. The discriminating portion 24 controls connection of each of switches 41 to 45 of the switching unit 4 to switch the operation mode between an occupant sensing mode and a wet sensing mode. In other words, the discriminating portion 24 includes a mode switching portion for switching the operation mode between the occupant sensing mode and the wet sensing mode. The occupant sensing mode and the wet sensing mode will be described later in detail.

The switching unit 4 includes a first switch 41, a second switch 42, a third switch 43, a fourth switch 44 and a fifth switch 45.

The first switch 41 is an electromagnetic switch one end of which is connected to the voltage applying portion 21 through the operational amplifier b1 and the resistor r1, and the other end of which is connected to the main electrode 11. The second switch 42 is an electromagnetic switch one end of which is connected to the voltage applying portion 21 through the operational amplifier b2 and the resistor r2, and the other end of which is connected to the guard electrode 13. The third switch 43 is an electromagnetic switch one end of which is connected to the voltage applying portion 21 through the operational amplifier b3 and the resistor r3, and the other end of which is connected to the sub electrode 12.

The fourth switch 44 is an electromagnetic switch one end of which is connected to the other end of the third switch and the sub electrode 12, and the other end of which is connected to the vehicle ground GND. The fifth switch 45 is an electromagnetic switch one end of which is connected to the voltage applying portion 21 through the operational amplifier b4 and the resistor r4, and the other end of which is connected to the noise electrode 14.

The first switch 41 and the second switch 42 are normally kept in a connected state, and connection and disconnection thereof are switched at the time of fault diagnosis.

(Occupant Sensing Mode)

In the occupant sensing mode, the discriminating portion 24 makes the first switch 41, the second switch 42, the third switch 43, and the fifth switch 45 in the connected state. In this state, the main electrode 11, the sub electrode 12, the guard electrode 13 and the noise electrode 14 have the same potential. Thus, each of the main electrode 11, the sub electrode 12, the guard electrode 13 and the noise electrode 14 generates the electric field with the reference electrode 3.

The guard electrode 13 has the same potential as the main electrode 11, on the lower side of the main electrode 11. The guard electrode 13 restricts the main electrode 11 from generating the electric field with the reference electrode 3 on the lower side without through the seat surface 911 of the seat 9. That is, the guard electrode 13 is provided to allow the main electrode 11 to securely generate the electric field on the seat 9.

The sub electrode 12 is provided to sense a wet condition of the seat 9, that is, to sense whether the seat 9 is wet, in the wet seat sensing mode. The sub electrode 12 has the same potential as the main electrode 11 in the occupant sensing mode. Therefore, the sub electrode 12 generates the electric field with the reference electrode 3, similarly to the main electrode 11. The capacitance generated in this state is used for discriminating the occupant. Also, the sub electrode 12 restricts a line of electric force from an end portion (edge portion) of the main electrode 11 from extending from the end portion of the main electrode 11 toward the reference electrode 3 without passing through the seat 9 and the occupant. That is, the sub electrode 12 restricts the line of electric force of the main electrode 11 from leaking in a horizontal direction.

The current sensing portion 22 senses an electric current flowing in each of the main electrode 11, the sub electrode 12 and the noise electrode 14 in the occupant sensing mode. Specifically, the current sensing portion 22 senses an electric current (main current) flowing in the resistor r1, an electric current (sub current) flowing in the resistor r3, and an electric current (noise current) flowing in the resistor r4. In the present embodiment, the current sensing portion 22 is provided with a multiplexer (MPX).

The capacitance calculating portion 23 calculates an impedance (value corresponding to the impedance) of the current path including in between the electrodes, based on the main current, the sub current, the noise current, and the detection voltage. Specifically, the capacitance calculating portion 23 calculates the impedance based on a value (noise removed value) that is obtained by subtracting the noise current from the sum of the main current and the sub current, and the detection voltage.

The noise removed value is a value obtained by adding the sub current to a difference between a current value based on the main current and a current value based on the noise current. In this example, the current value based on the main current is a value of the main current, and the current value based on the noise current is a value of the noise current.

The capacitance calculating portion 23 calculates the susceptance (imaginary part) and the conductance (real part) of the impedance calculated. Each of the susceptance and the conductance can be obtained by sampling a signal waveform at a phase 0 and a phase 90° at the time of sensing. The susceptance has a value according to the capacitance. The capacitance can be sensed by calculating the susceptance.

In the present embodiment, the susceptance and the conductance are calculated based on the noise removed value as mentioned above. The noise current is decided according to the capacitance between the noise electrode 14 and the reference electrode 3. The electric field generated between the noise electrode 14 and the reference electrode 3 does not pass through the seat surface 911 of the seat 9, and is not affected by the presence or absence of an occupant on the seat 9. That is, the electric field generated by the noise electrode 14 is the same as the electric field generated by the main electrode 11 when the seat 9 is not occupied, that is, in the unoccupied state of the seat 9.

Figure 4:
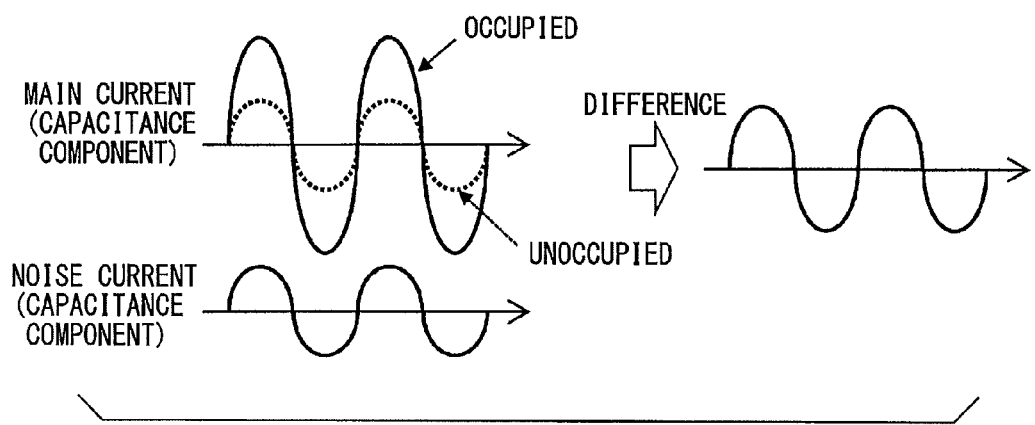
FIG. 4 is a diagram for explaining a main current and a noise current according to the first embodiment.

Therefore, as shown in FIG. 4, the main current sensed in the unoccupied state of the seat 9 and the noise current have substantially the same waveform. In other words, the noise electrode 14 is formed such that the main current and the noise current have the same current value, that is, indicate substantially the same signal waveform in the unoccupied state. In FIG. 4, solid-line curves indicate signal waveforms in an occupied state where the seat 9 is occupied by an occupant, and a dashed-line curve indicates a signal waveform in the unoccupied state of the seat 9.

As shown in FIG. 4, in the unoccupied state of the seat 9, the difference of the capacitance components is zero by subtracting the noise current from the main current. When the seat 9 is occupied by an occupant, the amount of increase of the main current due to the occupant can be detected by subtracting the noise current from the main current. Therefore, the discriminating portion 24 can discriminate the occupant, similarly to the prior to the subtraction.

Figure 5:
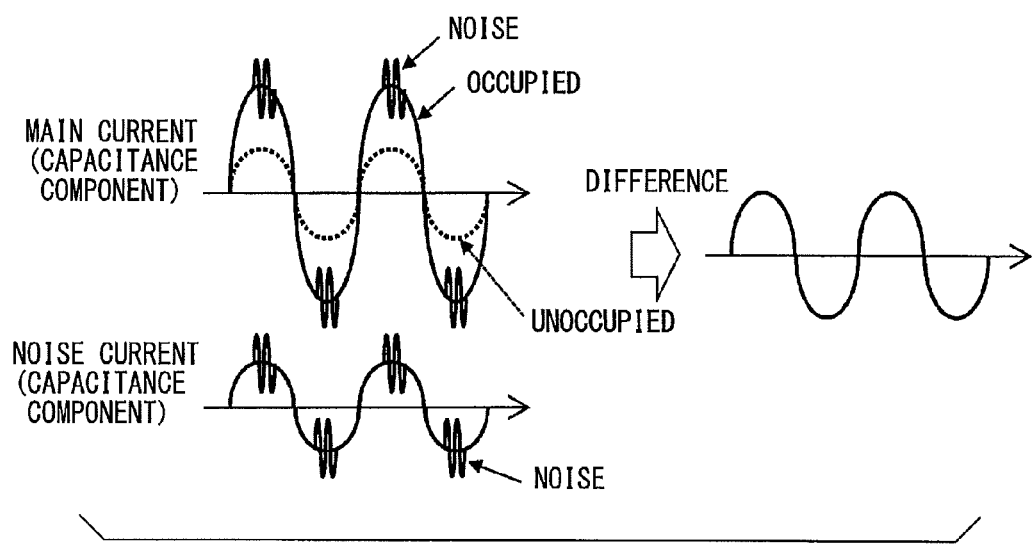
FIG. 5 is a diagram for explaining a main current and a noise current according to the first embodiment.

As shown in FIG. 5, when the electrostatic sensing unit 1 is affected by an electric noise, the waveform of the main current sensed and the waveform of the noise current sensed are applied with a high frequency waveform due to the electric noise. In the present embodiment, the capacitance calculating portion 23 calculates the capacitance (capacitance component) based on the difference between the main current and the noise current. Therefore, the waveform due to the electric noise is cancelled, and the amount of increase of the main current due to the occupant is sensed. That is, the capacitance calculating portion 23 can sense the capacitance based on the waveform from which the waveform due to the electric noise is substantially removed. In FIG. 5, solid-line curves indicate signal waveforms in the occupied state of the seat 9 is occupied by an occupant, and a dashed-line curve indicates a signal waveform in the unoccupied state of the seat 9.

When the capacitance calculating portion 23 calculates the noise removed value, the capacitance component of the sub current is also added. However, because the sub current is smaller than the main current, the influence of the electric noise is small. The capacitance calculating portion 23 may calculate the capacitance based on the difference between the main current and the noise current and the detection voltage, without adding the sub current.

Figure 6:
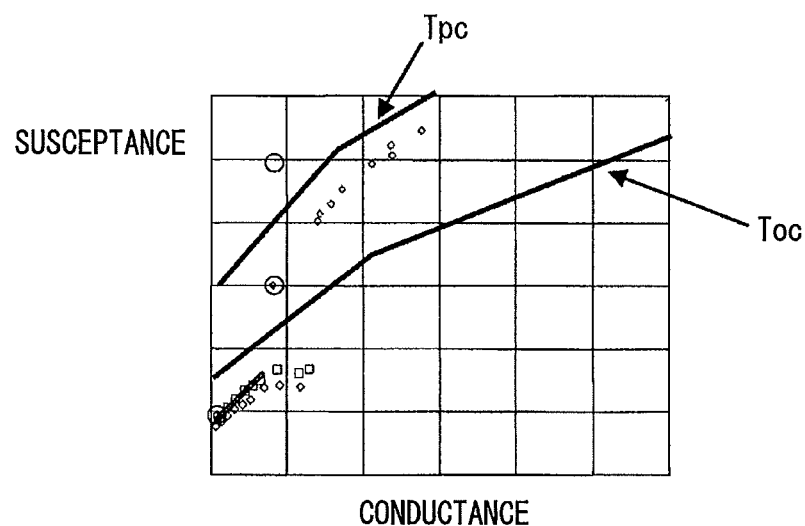
FIG. 6 is a graph for explaining an occupant discrimination according to the first embodiment.

As shown in FIG. 6, the discriminating portion 24 compares the susceptance (capacitance) and the conductance with predetermined threshold values, such as an occupant threshold Toc and a physical constitution threshold Tpc to determine the presence or absence of an occupant and to discriminate the type of the occupant.

When a calculated value is equal to or greater than the occupant threshold Toc, the discriminating portion 24 determines that there is an occupant on the seat 9, such as "occupied". When the calculated value is less than the occupant threshold Toc, the discriminating portion 24 determines that the seat 9 is not occupied or there is a child safety seat on the seat 9, such as "unoccupied or child safety seat".

When the discriminating portion 24 determines that there is an occupant on the seat 9, the discriminating portion 24 compares the calculated value with the physical constitution threshold Tpc to discriminate the type of the occupant. For example, when the calculated value is equal to or greater than the physical constitution threshold Tpc, the discriminating portion 24 determines that the occupant is of a large build. When the calculated value is less than the physical constitution threshold Tpc, the discriminating portion 24 determines that the occupant is of a small build.

The discrimination of the occupant may be performed only by the susceptance (capacitive component). When the conductance is considered in addition to the susceptance (capacitance component), the accuracy of discrimination is improved. The discrimination of the occupant using the capacitance may be performed by a known method.

The discriminating portion 24 transmits the result of discrimination to an airbag ECU (not shown). When the result of discrimination of a passenger seat indicates "occupied", the airbag ECU permits an activation of an airbag for the passenger seat in the event of collision. When the result of discrimination of the passenger seat indicates "unoccupied or child safety seat", the airbag ECU prohibits the activation of the airbag for the passenger seat in the event of collision.

(Wet Sensing Mode)

In the wet sensing mode, the discriminating portion 24 makes the first switch 41, the second switch 42 and the fourth switch 44 in the connected state, and makes the third switch 43 and the fifth switch 45 in the disconnected state. In this state, the sub electrode 12 is connected to the vehicle ground GND. A potential difference occurs between the sub electrode 12 and the main electrode 11, and the electric field is generated.

The current sensing portion 22 senses the main current flowing in the first switch 41. The capacitance calculating portion 23 calculates the impedance based on the main current and the detection voltage to sense the capacitance (second capacitance). The discriminating portion 24 determines whether the seat bottom 91 of the seat 9 is wet based on the capacitance.

When the discriminating portion 24 determines that the seat 9 is wet, the discriminating portion 24 prohibits the discrimination of the occupant, and notifies the occupant of the seat 9 being wet. In a case where the discriminating portion 24 determines that the seat 9 is wet, the discriminating portion 24 may perform the discrimination of the occupant using an occupant discrimination map considering the seat 9 being wet.

According to the first embodiment, since the difference between the main current and the noise current is employed, the current value in which the electric noise applied on the main current is cancelled by the electric noise applied on the noise current can be used as a factor for discrimination of an occupant.

At least a part of the electric noise of the main current can be removed by performing the subtraction with the noise current. In the present embodiment, all the electric noise of the main current can be substantially removed.

The capacitance calculating portion 23 calculates the capacitance (first capacitance) based on the detection voltage, the noise removed value and the sub current. Therefore, the influence of the electric noise is reduced, and the accuracy of the occupant discrimination improves.

Since the noise electrode 14 is installed in the electrostatic sensing unit 1, additional parts and an installation space for the additional parts are not necessary. As such, it is less likely that the installation space and the number of parts will increase.

The noise electrode 14 is formed such that the main current and the noise current have the same current value in the unoccupied state of the seat 9. Therefore, the waveform of the main current and the waveform of the noise current, both of which are applied with the same electric noise, have the same shape, i.e., are on the same level. As such, when the difference between the main current and the noise current is employed, the electric noise can be further accurately removed.

In the present embodiment, the guard electrode 13 and the noise electrode 14 are the same electrode members as the main electrode 11. Namely, the guard electrode 13 and the noise electrode 14 have the same shape and the same surface area as those of the main electrode 11. In this case, the area of the electrode means a surface area of the plate shape.

Second Embodiment

A capacitance type occupant sensor according to a second embodiment is different from the capacitance type occupant sensor of the first embodiment because an electrostatic sensing unit 1B does not have the sub electrode 12, and the wet sensing mode is not included.

In the description of the second embodiment, the reference numbers same as those of the first embodiment indicate the same structures, and the descriptions of the same structures are referred to the preceding descriptions.

Figure 7:
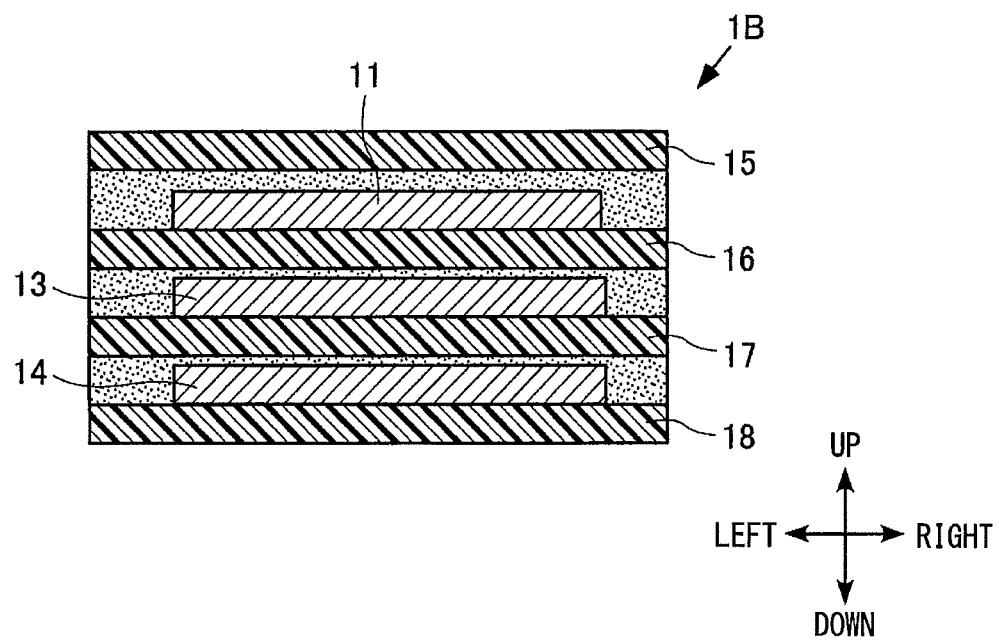
FIG. 7 is a diagram illustrating a schematic cross-section of an electrostatic sensing unit of a capacitance type occupant sensor according to a second embodiment of the present disclosure.

In the second embodiment, as shown in FIG. 7, the electrostatic sensing unit 1B includes the main electrode 11, the guard electrode 13, the noise electrode 14, and the film members 15 to 18. The noise electrode 14 is the same electrode member as the main electrode 11.

The capacitance calculating portion 23 calculates the capacitance (susceptance) based on the difference between the main current and the noise current, and the detection voltage. Since the main electrode 11 and the noise electrode 14 are the same electrode members, that is, the main electrode 11 and the noise electrode 14 have the same configuration, the main current and the noise current are substantially equal to each other when the seat 9 is not occupied. Therefore, as shown in FIG. 5, the electric noise is removed in the difference between the main current and the sub current.

As described above, since the difference between the main current and the noise current is used in the calculation of the capacitance, the influence of the electric noise can be reduced.

The noise electrode 14 is disposed between the film member 17 and the film member 18. That is, the noise electrode 14 is integrally arranged in the electrostatic sensing unit 1B. Therefore, it is less likely that the installation space and the number of parts will increase.

In the second embodiment, the sub current is not used in the detection of the capacitance. Therefore, the influence of the electric noise on the sub current can be eliminated.

Third Embodiment

A capacitance type occupant sensor according to a third embodiment is different from the capacitance type occupant sensor because the area of a noise electrode 14C is greater than that of the noise electrode 14 of the first embodiment.

In the description of the third embodiment, the reference numbers same as those of the first embodiment indicate the same structures, and the descriptions of the same structures are referred to the preceding descriptions.

Figure 8:
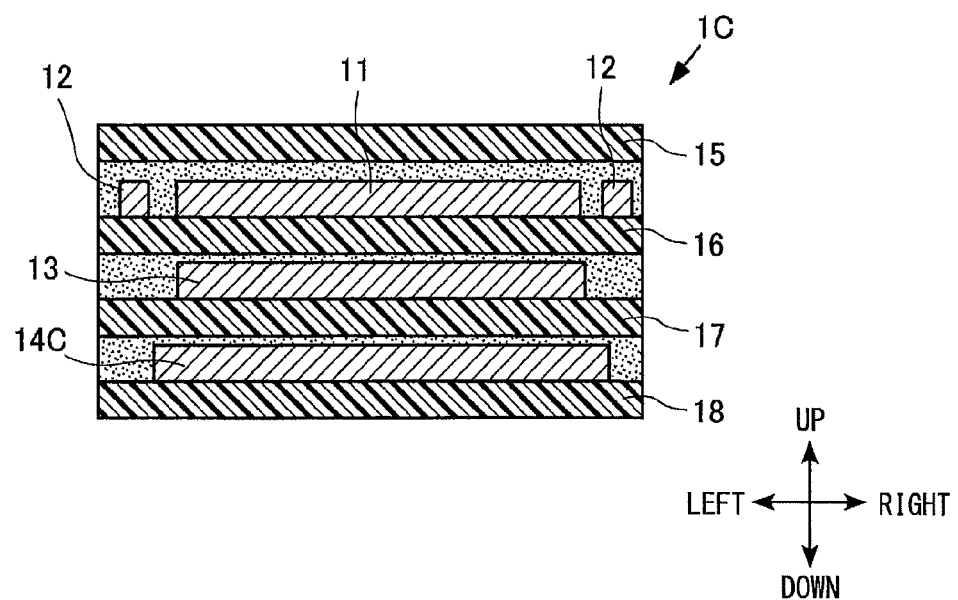
FIG. 8 is a diagram illustrating a schematic cross-section of an electrostatic sensing unit of a capacitance type occupant sensor according to a third embodiment of the present disclosure.

In the third embodiment, as shown in FIG. 8, an electrostatic sensing unit 1C includes the main electrode 11, the sub electrode 12, the guard electrode 13, the noise electrode 14C and the film members 15 to 18. The noise electrode 14C is a conductive member having a plate shape. The noise electrode 14C is disposed in the electrostatic sensing unit 1C, similarly to the first embodiment.

The noise electrode 14C is formed such that the noise current and the sum of the main current and the sub current have the same current value in the unoccupied state of the seat 9.

Considering the sub electrode 12, the noise electrode 14C has the area greater than the area of the main electrode 11. The area of the noise electrode 14C may be equal to the sum of the area of the main electrode 11 and the area of the sub electrode 12.

The capacitance calculating portion 23 calculates the capacitance based on the difference between the sum of the main current and the sub current and the noise current, and the detection voltage, similarly to the first embodiment.

In the third embodiment, as described above, the noise electrode 14 is designed such that the noise current in the unoccupied state and the sum of the main current and the sub current in the unoccupied state are on the same level. Therefore, the capacitance calculating portion 23 can accurately cancel the sum of the electric noise applied on the main electrode 11 and the electric noise applied on the sub electrode 12 by the electric noise applied on the noise electrode 14. As such, the influence of the electric noise can be accurately reduced.

Further, similarly to the first embodiment, it is less likely that the installation space will increase and the number of parts will increase.

Fourth Embodiment

A capacitance type occupant sensor according to a fourth embodiment is different from the capacitance type occupant sensor on a point that the shape of a noise electrode 14D is mainly different from that of the noise electrode 14 of the first embodiment.

In the description of the fourth embodiment, the reference numbers same as those of the first embodiment indicate the same structures, and the descriptions of the same structures are referred to the preceding descriptions.

Figure 9:
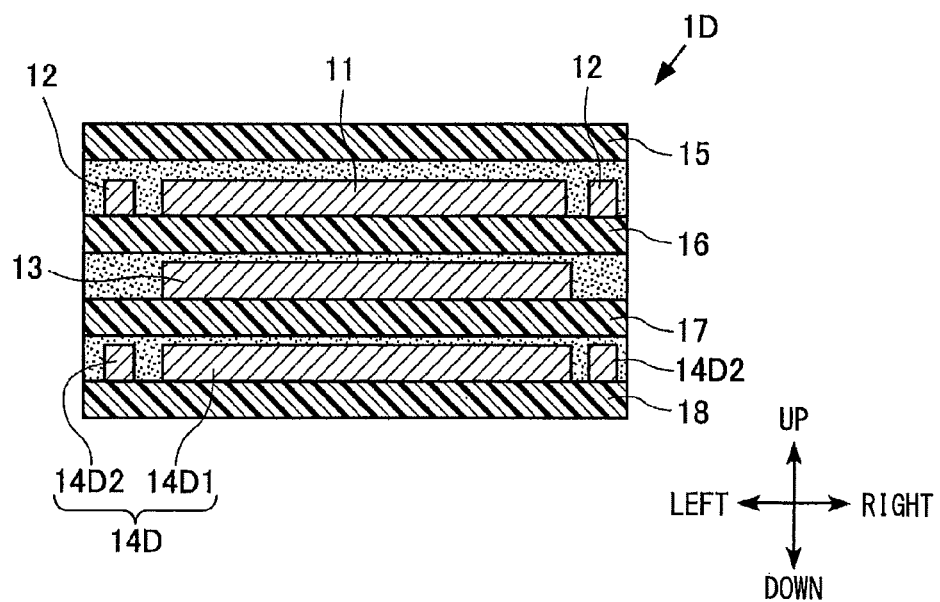
FIG. 9 is a diagram illustrating a schematic cross-section of an electrostatic sensing unit of a capacitance type occupant sensor according to a fourth embodiment of the present disclosure.

In the fourth embodiment, as shown in FIG. 9, an electrostatic sensing unit 1D includes the main electrode 11, the sub electrode 12, the guard electrode 13, the noise electrode 14D, and the film members 15 to 18.

The noise electrode 14D is a conductive member having a plate shape. Similarly to the first embodiment, the noise electrode 14D is disposed between the film member 17 and the film member 18.

The noise electrode 14D includes a first noise electrode portion 14D1 and a second noise electrode portion 14D2. The first noise electrode portion 14D1 is the electrode member same as the main electrode 11. The second noise electrode portion 14D2 is the electrode member same as the sub electrode 12.

The second noise electrode portion 14D2 is arranged to be spaced from and be parallel to the first noise electrode portion 14D1, similarly to the arrangement relationship between the main electrode 11 and the sub electrode 12.

In the occupant sensing mode, the first noise electrode portion 14D1 and the second noise electrode portion 14D2 are applied with the detection voltage. The current sensing portion 22 senses a current (noise current) flowing in the noise electrode 14D. Specifically, the current sensing portion 22 senses a current (first noise current) flowing in the first noise electrode portion 14D1 and a current (second noise current) flowing in the second noise electrode portion 14D2.

In the fourth embodiment, the shape of the noise electrode 14D corresponds to the shape of the main electrode 11 and the sub electrode 12. Therefore, in the unoccupied state, the sum of the main current and the sub current can be made easily on the same level as the noise current. Namely, the capacitance calculating portion 23 obtains the difference between the sum of the main current and the sub current and the noise current. Therefore, the electric noise can be accurately removed.

Further, the noise electrode 14D can be designed to have the same structure as those of the main electrode 11 and the sub electrode 12. Therefore, it is easy to design the noise electrode 14D.

Similarly to the first embodiment, it is less likely that the installation space will increase, and the number of parts will increase.

The capacitance calculating portion 23 may calculate the capacitance based on the difference between the main current and the first noise current, the difference between the sub current and the second noise current, and the detection voltage.

Other Embodiments

The present disclosure may not be limited to the embodiments described hereinabove, but may be implemented in various other ways.

For example, it is not always necessary that the area of the noise electrode is equal to the area of the main electrode 11, or to the sum of the area of the main electrode 11 and the area of the sub electrode 12.

The electric noise may be removed by comparing the main current and the noise current in the unoccupied state and based on the ratio thereof. Namely, the influence of the electric noise can be reduced by sensing and using the noise current, irrespective of the simple difference between the main current and the noise current. For example, the influence of the electric noise can be reduced by multiplying the noise current by a ratio and by obtaining a difference between the multiplied noise current and the main current.

In other words, the capacitance calculating portion 23 may calculate the first capacitance based on a difference between a current value based on the main current and a current value based on the noise current, and the detection voltage. In this case, for example, the current value based on the main current may be the value of the main current or a value obtained by substituting the main current for a certain relational expression. Also, the current value based on the noise current may be the value of the noise current or a value obtained by subtracting the noise current for a certain relational expression.

The capacitance calculating portion 23 may use the difference between the sub current and the noise current for calculation of the capacitance.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A capacitance type occupant sensor for a vehicle, comprising:
   a reference electrode being applied with a reference potential;
   an electrostatic sensing unit being disposed in a seat of the vehicle, the electrostatic sensing unit including a main electrode, a guard electrode and a noise electrode, the guard electrode being disposed adjacent to a lower side of the main electrode and applied with the reference potential, the noise electrode being disposed adjacent to a lower side of the guard electrode;
   a voltage applying portion applying a detection voltage to the main electrode and the noise electrode;
   a current sensing portion sensing a main current flowing in the main electrode and a noise current flowing in the noise electrode;
   a capacitance calculating portion calculating a first capacitance based on the detection voltage, the main current and the noise current; and
   a discriminating portion discriminating an occupant based on the first capacitance, wherein
   the noise electrode is disposed such that the noise current has a same current value as that of the main current in an unoccupied state of the seat, and
   the capacitance calculating portion calculates the first capacitance based on the detection voltage and a difference between the main current and the noise current.

2. The capacitance type occupant sensor according to claim 1, wherein
   the noise electrode has an area equal to an area of the main electrode.

3. The capacitance type occupant sensor according to claim 1, wherein
   the discriminating portion switches an occupant sensing mode to sense an occupant and a wet sensing mode to sense a wet condition of the seat,
   the electrostatic sensing unit includes a sub electrode disposed parallel to the main electrode,
   the voltage applying portion applies, in the occupant sensing mode, the detection voltage to the main electrode, the guard electrode, the noise electrode and the sub electrode, and causes, in the wet sensing mode, a potential difference between the main electrode and the sub electrode,
   the current sensing portion detects a sub current flowing in the sub electrode,
   the capacitance calculating portion calculates, in the occupant sensing mode, the first capacitance based on the detection voltage, the main current and the noise current, and calculates, in the wet sensing mode, a second capacitance based on the potential difference and one of the main current and the sub current,
   the discriminating portion discriminates, in the occupant sensing mode, the occupant based on the first capacitance, and determines, in the wet sensing mode, whether the seat is wet based on the second capacitance.

4. The capacitance type occupant sensor according to claim 3, wherein
   the noise electrode is disposed such that the noise current and a sum of the main current and the sub current have a same current value in the unoccupied state of the seat, and
   the capacitance calculating portion calculates, in the occupant sensing mode, the first capacitance based on a difference between the noise current and the sum of the main current and the sub current, and the detection voltage.

* * * * *